US011082501B2

(12) United States Patent
Wang et al.

(10) Patent No.: US 11,082,501 B2
(45) Date of Patent: *Aug. 3, 2021

(54) INDIRECT TRANSMISSION OF SESSION DATA

(71) Applicant: Google LLC, Mountain View, CA (US)

(72) Inventors: Gang Wang, Mountain View, CA (US); Sagnik Nandy, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/855,952

(22) Filed: Apr. 22, 2020

(65) Prior Publication Data

US 2020/0267225 A1 Aug. 20, 2020

Related U.S. Application Data

(63) Continuation of application No. 15/961,763, filed on Apr. 24, 2018, now Pat. No. 10,666,741.

(51) Int. Cl.
*G06F 15/16* (2006.01)
*H04L 29/08* (2006.01)
*H04L 29/06* (2006.01)
*H04L 12/743* (2013.01)

(52) U.S. Cl.
CPC ........ *H04L 67/148* (2013.01); *H04L 45/7453* (2013.01); *H04L 63/08* (2013.01); *H04L 67/145* (2013.01); *H04L 67/146* (2013.01); *H04L 67/02* (2013.01)

(58) Field of Classification Search
CPC ... H04L 67/148; H04L 45/7453; H04L 63/08; H04L 67/145; H04L 67/146; H04L 67/02; H04L 67/1023; H04L 67/142; H04L 67/141; H04L 67/18; H04L 67/2814
See application file for complete search history.

(56) References Cited

U.S. PATENT DOCUMENTS

| | | | |
|---|---|---|---|
| 7,188,181 B1 | 3/2007 | Squier et al. | |
| 2002/0133720 A1* | 9/2002 | Sherman | H04L 63/0236 726/13 |
| 2006/0155857 A1* | 7/2006 | Feenan, Jr. | G06F 16/9574 709/227 |
| 2013/0124309 A1* | 5/2013 | Traasdahl | G06Q 30/0251 705/14.49 |
| 2013/0246563 A1* | 9/2013 | Cardozo | G06F 16/955 709/217 |

(Continued)

OTHER PUBLICATIONS

Non-Final Office Action for U.S. Appl. No. 15/961,763 dated Sep. 19, 2019 (11 pages).

(Continued)

*Primary Examiner* — Cheikh T Ndiaye
(74) *Attorney, Agent, or Firm* — Foley & Lardner LLP

(57) ABSTRACT

The systems and methods described herein can enable the indirect transmission of session data between different domains. The system can pass the session data through a hashing function so that the data from a given domain remains private and secure to the specific domain. The system can generate clusters of associated domains for a given client device that the system can use to maintain a session between the client device and the domain.

20 Claims, 5 Drawing Sheets

(56) References Cited

U.S. PATENT DOCUMENTS

2014/0244387 A1* 8/2014 Patton ................ G06Q 30/0255
                                                      705/14.53
2015/0088978 A1* 3/2015 Motukuru ............... H04L 67/02
                                                      709/203
2017/0093888 A1* 3/2017 Marzorati ............... H04L 43/08

OTHER PUBLICATIONS

Notice of Allowance for U.S. Appl. No. 15/961,763 dated Jan. 31, 2020 (8 pages).

* cited by examiner

INDIRECT TRANSMISSION OF SESSION DATA

CROSS-REFERENCE TO RELATED APPLICATION

This application claims the benefit and priority as a continuation under 35 U.S.C. § 120 to U.S. patent application Ser. No. 15/961,763, entitled "Indirect Transmission of Session Data," filed Apr. 24, 2018, which is hereby incorporated by reference in its entirety.

BACKGROUND OF THE DISCLOSURE

When a client device visits a website, the website can transmit small packets of data to the client device. The small packets of data can include preferences, session information, or information to be used to authenticate and maintain a session between the client device and the device hosting the website. The data stored in the client device by the website can be stored indefinitely or can be purged at regular intervals. In some implementations, to prevent malicious attacks known as cross-site or cross-domain attacks or undesired behavior, web browsers can prevent domains from accessing the data of other domains or from storing data on the client device when the client device is not in an active session with the domain.

SUMMARY OF THE DISCLOSURE

In some implementations, through the use of only first-party data, the systems and methods described herein can enable the indirect transmission of session data between different domains. The system can use a deterministic method to determine node clusters that can enable the transmission control of session data between client devices and other system node devices, without requiring direct communications between server devices.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
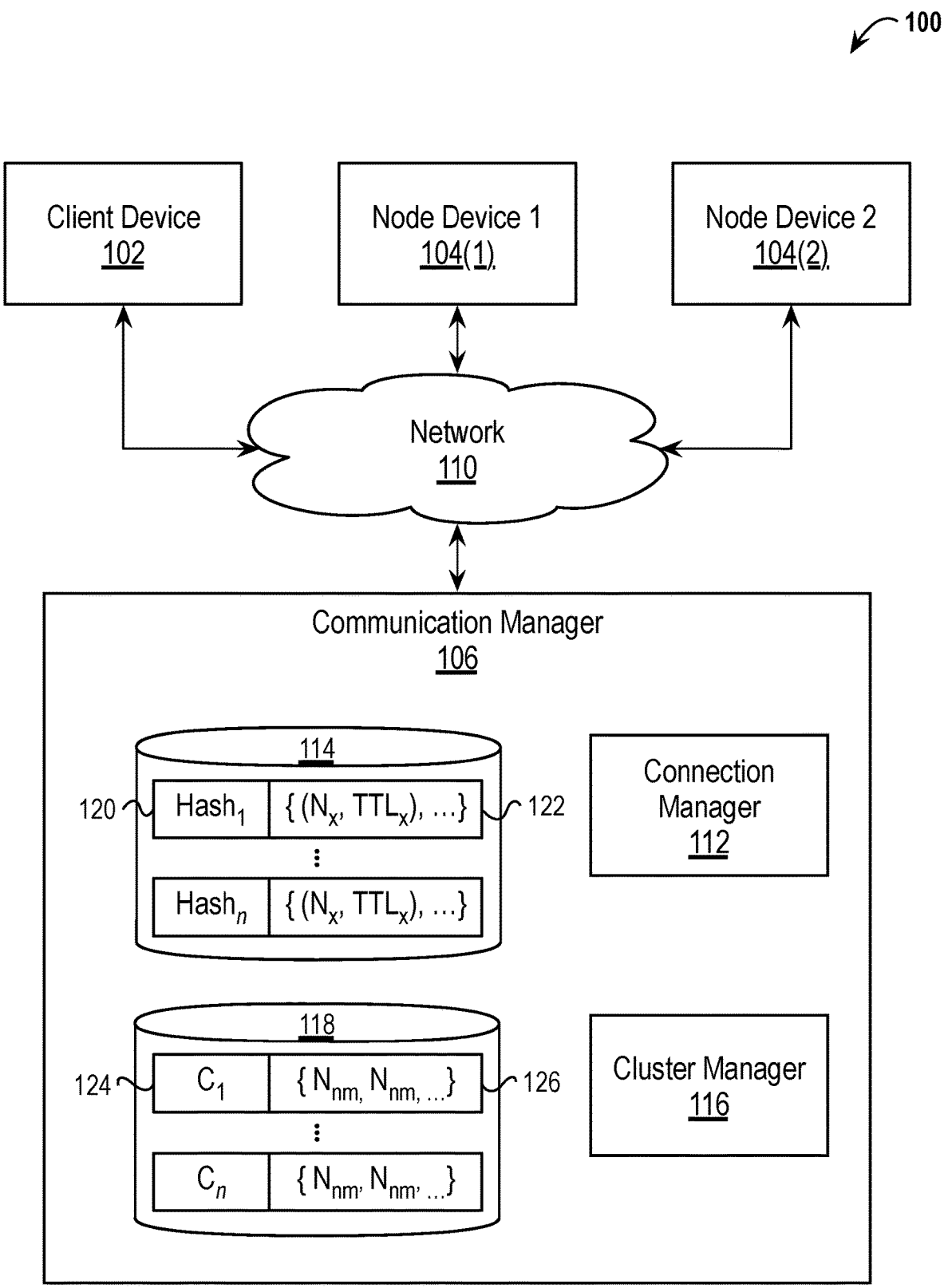
FIG. 1 illustrates a block diagram of a system for the indirect communication of data, according to one implementation.

The various concepts introduced above and discussed in greater detail below may be implemented in any of numerous ways, as the described concepts are not limited to any particular manner of implementation. Examples of specific implementations and applications are provided primarily for illustrative purposes.

When a client device renders a website provided by a content provider and executes the code of the website, the code can cause small amounts of data to be stored on the client device (e.g., a HyperText Transport Protocol (HTTP) cookie). The data can include stateful information about, for example, preferences or previous interactions with the website, or information about the client device (e.g., device identifier, user account, or any other such information). In some implementations, the data can include an authentication token that informs the content provider that the client device previously authenticated with the content provider. The presence of the authentication token on the client device can mean the client device does not need to re-authenticate with the content provider (e.g., provide a user name and password again) to receive content from the content provider the next time the client device requests content from the content provider. Not having to re-authenticate with the content provider can save time and bandwidth as the client device does not have to go through the authentication processes each time the client device interacts with the content provider for additional data.

In some implementations, a content provider can only access data on the client device that it caused to be stored on the client device. For example, the content provider can only access HTTP cookies from domains that it operates. In some implementations, the content provider can only access data on the client device that it caused to be stored there because the web browser includes a policy to limit access. Additionally, some countries have implemented regulations that can prevent content providers from placing or accessing third-party cookies. In some implementations, secondary content providers may provide content that is displayed along with the primary content from the primary content provider. For example, the content provider can provide a website that includes secondary content slots. Execution, by the client device, of the code associated with the secondary content slots, can cause the client device to fetch or request secondary content from the secondary content providers to render in the secondary content slots. In some implementations, when providing the secondary content, the secondary content providers can also provide data to store on the client device. The data provided by the secondary content providers can be referred to as "third-party" cookies because they are not associated with the domain of the content provider. In some implementations, third-party cookies can be used to generate or select customized content for the secondary content slots.

In some implementations, the third-party cookies can be used for centralized or single sign-on authentication. For example, a company may own several domains and an additional domain can manage authentication of client devices and manage the client device's session with the domains. However, some web browsers block the use of third-party cookies. For example, only the primary domain can save cookies to the client device and the web browser can discard or prevent cookies from different domains. This can prevent single sign-on authentication. In this example, because the authentication is processed via a primary domain that the web browser does not directly visit, the web browser can consider the authentication domain a third-party domain and block authentication tokens (e.g., cookies) from the authentication domain. This can prevent the web browser from authenticating with multiple domains via a central authentication domain.

In some implementations, through the use of only first-party cookies, the systems and methods described herein can enable the indirect transmission of session data between different domains. Additionally, as described below, the system can pass the session data through a hashing and/or encryption function so that the cookies of a given domain remain private and secure to the specific domain. The system can generate clusters of associated domains for a given client device that the system can use to select customized content for the client device or maintain an active session across the domains. Thus, the systems and methods described herein allow for exchange of information between third-party entities that would be blocked by typical web browsers and other computing devices that prevent cross-domain data exchange, without requiring modifications to the browser, direct connections between the third-party entities, or other such steps. This allows for rich, multi-source content (e.g., web pages with embedded third-party content, mixed media, or other such content), without sacrificing security of the client device and browser environment. In some implementations, by allowing session data to be retained and passed to third-party servers, some inter-server communications and/or client-server communications may be reduced or eliminated, reducing bandwidth requirements and potentially reducing latency and network congestion.

FIG. 1 illustrates a block diagram of an example system 100 for the indirect communication of data. The system 100 can enable the transmission of customized content to the client device 102. In some implementations, the content is customized or dynamically selected responsive to the indirection communication between the node devices of the system 100. The system 100 can include at least a first node device 104(1) and a second node device 104(2). The system 100 can include any number of node devices, which can be collectively referred to as node devices 104. The system 100 can include a communication manager 106. The communication manager 106 can be referred to as a communication interface. The components of the system 100 can communicate over a network 110. In some implementations, the network 110 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof.

The client device 102 can be any computing or other data processing device that includes one or more processors. For example, the client device 102 can be a mobile device, such as a mobile phone, tablet, or laptop computing device; a wearable computing device; a networked appliance (e.g., an Internet-of-Things or IoT appliance); a single computing device, such as a work station, laptop, or desktop computer; or multiple computing devices, such as a computer cluster, or server farm. In some implementations, the client device may comprise a virtual device executed by one or more hardware devices.

The client device 102 can render content provided by the node devices 104 and the communication manager 106. For example, the client device's processors can execute a web browser (or other user agent) that generates content requests. In some implementations, the client device 102 can transmit a content request to one of the node devices 104. In response to the content request, the recipient node device 104 can provide primary content (e.g., a web page, data file, media file, or other such content) to the client device 102. The primary content can include one or more content slots for secondary content, sometimes referred to as embedded content (e.g., images, media, executable scripts, etc. provided from another source or server). The content slots can include code that when executed by the client device 102 cause the client device 102 to request or retrieve secondary content from a secondary content server, which can be the communication manager 106 or another content provider. In some implementations, the secondary content can be provided by the node device 104 providing the primary content or a different node device 104.

In some implementations, the client device 102 can receive and store data from one or more of the node devices 104. The data can be stored in the form of a HTTP "cookie." The cookie for a specific node device 104 can include stateful information that the node device 104 can use during current and future communication sessions. For example, the stateful information can include preferences, previously provided form field data, authentication tokens, or other settings. In some implementations, each of the cookies can expire. The client device 102 can delete the cookie once the cookie has expired. The cookie can expire when a duration specified by the cookie's time-to-live (TTL) flag is reached. In some implementations, the client device 102 can automatically purge the cookies after a predetermined duration. For example, the client device 102 can automatically purge the cookie after 1 to 30 days or when the browser session is closed.

In some implementations, a node device 104 can only save data to the client device 102 when the client device's browser is viewing content from a domain associated with the node device 104. In some implementations, a node device 104 can only access cookies or data stored on the client device 102 if the data is associated with the domain of the node device 104. For example, a browser executed by the client device 102 can allow first-party cookies and block third-party cookies, or only allow cookies from a server that is associated with the domain of a currently displayed web page (e.g., when browsing a page at the URL "www.example.com/index.html" that includes an embedded image from "www.anotherexample.com/image.jpg", allowing cookies from the example.com server, but not allowing cookies from the anotherexample.com server). This may be done to prevent cross-site attacks, such as where an embedded script attempts to access user data or cookies associated with the primary domain.

The communication manager 106 can be any type of data processing system. The communication manager 106 can include one or more processors. In some implementations, the data processing system can be a single computer, computer cluster, or server farm. In some implementations, the data processing system may comprise a virtual device executed by one or more hardware devices.

The communication manager 106 can enable the transmission or sharing of data between the node devices 104 of the system 100 without the use of third-party cookies. The communication manager 106 can serve as a cooperative between the node devices 104. The communication manager 106 can generate deterministic identifiers or cluster identifiers that can be used to enable the node devices 104 to provide customized content or content from secondary content providers without the use of third-party cookies. The communication manager 106 can also enable multiple node devices 104 to share session information. In some implementations, the communication manager 106 can generate the cluster identifiers using only first-party cookies. The clusters can include indications of first-party cookies that are associated with the same browser instance. In some implementations, the content of the cookies from a specific node device 104 is not shared with the communication manager 106 or the other node devices 104. For example, the content of the cookies can be passed through a hashing function, crypt-hashing function, or encrypted prior to transmission to the communication manager 106. The hashing functions described herein can be crypt-hashing functions, such as SHA-512. The communication manager 106 can generate new encryption keys at predetermined intervals. For example, the communication manager 106 can generate new keys daily, weekly, or monthly. The communication manager 106 can transmit the keys to authorized content providers to enable the content providers to decrypt the encrypted cluster identifiers and provide customized content based on the cluster identifiers. The content providers can also pull or fetch the keys from the communication manager 106 at predetermined intervals. Rotation of the encryption keys can also enable the communication manager 106 to enforce content policies. For example, if a content provider violates a content policy, the communication manager 106 can determine to not transmit or provide updated keys to the content provider, which would prevent the content provider from selecting custom content based on the encrypted cluster identifiers.

The communication manager 106 can include a connection manager 112 that can manage a connection database 114. The communication manager 106 can include a cluster manager 116 that can manage a cluster database 118. The connection database 114 can include a hash (or other form of) table. The hash table stored in the connection database 114 can include a plurality of keys 120 that are each associated with values 122. The keys 120 can be hashes that are generated based on data from the client device 102. The values 122 can indicate which of the node devices 104 the client device 102 initiated communications with. In some implementations, the hash can be generated by concatenating an indication of a user agent and a network location (and, in many implementations, by performing a hashing function on the concatenated input). For example, and as described further below, when generating a content request, the client device 102 can include the client device's user agent information and IP address in the content request. The user agent information and IP address can be relayed to the communication manager 106, which can pass the data through a hashing function to generate the hash that is stored as the key 120. In some implementations, the node device 104 can generate the hash and transmit the hash (and not the user agent information and IP address) to the communication manager 106. Transmitting a hash to the communication manager 106 can obviate or reduce the amount of user agent information and IP addresses that the communication manager 106 receives and stores. Associated with each key 120 (e.g., each hash value), the connection manager 112 can store an indication of which node device 104 provided the hash. Although primarily discussed in terms of user agent information and IP address, other information may be used as inputs to the hashing function, including port numbers, media access control (MAC) addresses, application names, application versions, usernames, device types, or any other such information.

The cluster database 118 can include a table with a plurality of keys 124 that are each associated with a value 126. The keys 124 can each be a cluster identifier. The cluster identifier can also be referred to as a node identifier. In some implementations, the cluster identifier can be a hash of a cookie (or other data previously stored on the client device 102). The hash can be concatenated with a time stamp (or other sources of entropy, such as a random number generator or pseudo random number generator output, a counter value, a sequence number, or any other such data). For example, a given node device 104 may place a cookie on the client device 102. The cookie can be relayed the communication manager 106 (directly or through a node device 104). The cluster manager 116 can then use the cookie to generate a cluster identifier that is associated with the transmitting node device 104 and client device 102. By concatenating the time stamp or other data to the hash, the cluster identifier becomes one-time only so that third parties cannot take advantage of the cluster identifier via re-use.

In some implementations, the cluster identifier is generated by the node devices 104. In these implementations, the node device 104 that generated (or received) the cookie from the client device 102 generates the cluster identifier and does not transmit the cookie to the communication manager 106. This can increase privacy and security because the communication manager 106 only receives a hash of the cookie and does not receive the cookie itself.

In some implementations, the node device 104 can encrypt the hash with the public key of the communication manager 106. The values 126 can include an identification of the node device 104 that are associated with the cluster identifier. For example, if a cluster identifier is associated with both the node device 104(1) and the node device 104(2), the client device 102 for which the cluster identifier was generated previously visited both the node device 104(1) and the node device 104(2). Additionally, in this example, both of the node devices 104(1) and 104(2) stored data (e.g., cookies) on the client device 102. In some implementations, each element in the values 126 can be a hash of a cookie associated with the cluster identifier. For example, the cluster identifier can be the key 124 to a value 126 that includes {hash(cookie from node device 104(1)), hash(cookie from node device 104(2))}. The cookies used to generate the hashes associated with a given key 124 can be associated with a given client device 102. Because only hashes of the cookies are shared between the node devices 104 and the communication manager 106, security and a user's privacy can be protected.

Figure 2:
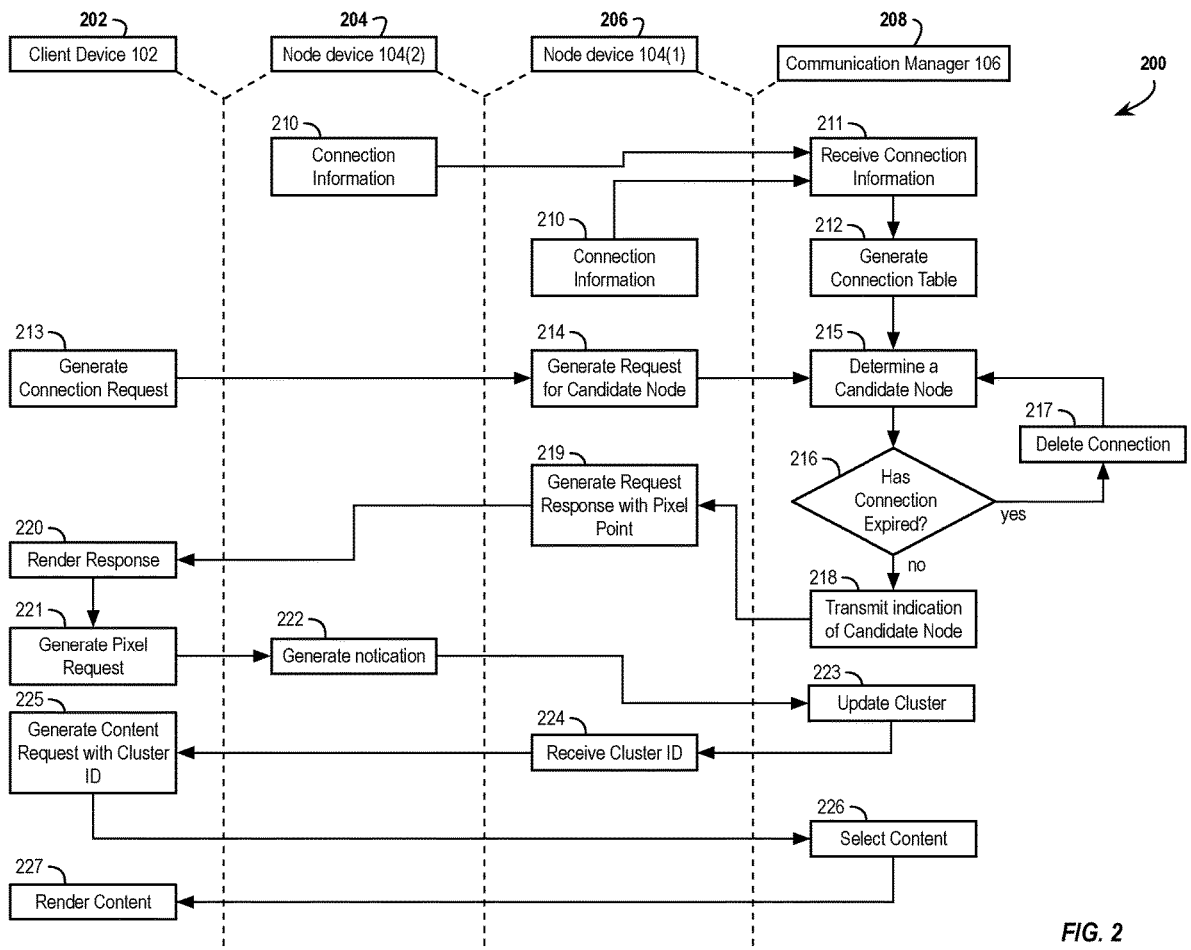
FIG. 2 illustrates a flow diagram of a method for indirectly communicating data to enable the selection of customized content, according to one implementation.

FIG. 2 illustrates flow diagram of an example method 200 for indirectly communicating data to enable the selection of customized content. In some implementations, the steps of the method 200 can be performed by one or more of the components of the system 100. For example, as illustrated in FIG. 2, the client device 102 can perform the steps illustrated in column 202, the node device 104(2) can perform the steps illustrated in column 204, the node device 104(1) can perform the steps illustrated in column 206, and the communication manager 106 can perform the steps illustrated in column 208. In other implementations, some or all of these functions or steps may be performed by a single device or group of devices.

In some implementations, prior to the client device 102 requesting content from the node device 104(1), the method 200 can include the node devices 104 transmitting connection information to the communication manager 106 (step 210). While the method 200 is illustrated using two node devices 104, the method 200 can be performed using any number of node devices 104. At regular intervals or when requested by the communication manager 106, the node devices 104 can transmit the connection information to the communication manager 106. The connection information can include user agent information and network location information for the connections established between client devices 102 and the respective node device 104 over a given period of time. The user agent information can be the name and version of the software that the client device 102 uses to establish a connection with the node device 104. For example, the user agent can be the web browser that establishes the connection. The network location can be the IP address and/or port associated with the user agent.

In one example, at a predetermined time (e.g., midnight, hourly, every minute, etc.), each of the node devices 104 can transmit an identification of each of the user agents with which the node device 104 established a connection and the respective network location (e.g., IP address) associated with the user agent. In some implementations, the node device 104 can generate a hash by concatenating the user agent and the network address information. The concatenated information can be processed with a hashing function to generate a hash value of a predetermined size. The hash value, rather than the user agent and network location information, can be transmitted to the communication manager 106 such that only the node device 104 with which the client device 102 established a connection is in possession of the connection information.

The method can include the communication manager 106 receiving the connection information from each of the node devices 104 (step 211). In some implementations, the communication manager 106 can poll the node devices 104 to request the connection information from node devices 104. In some implementations, the connection information can expire or the communication manager 106 can delete the connection information (or hashes thereof) at regular intervals. For example, the communication manager 106 can delete the connection information every day, week, or month.

The method 200 can include generating the connection table or database 114 (step 212). The connection manager 112 can generate the connection database 114. A hash of the user agent and network location received from the node devices 104 can be used as the key value 120 in the connection database 114. The node devices 104 can generate the hash prior to transmitting the connection information to the communication manager 106 or the connection manager 112 can generate the hash upon receiving the network connection information. The connection manager 112 can add each of the hashes to the connection database 114 as keys 120. For each key 120 (e.g., each hash), the connection manager 112 can then append to the value 122 an identification of which node device 104 provided the connection information. The connection manager 112 can also append a TTL element that indicates by which time the associated value should be purged or deleted from the connection database 114. In some implementations, storing an indication of a given node device 104 with a given hash can indicate that the client device 102 for which the hash was generated established a network connection with the given node device 104. The given node device 104 may not have stored a cookie on the client device 102 when the network connection was established.

For example, if the node device 104(1) provided the hash "99a74fbe" to the connection manager 112, at key location 99a74fbe, the node device identifier and a time-to-live (TTL) element can be saved. In this example, the key-value pair can be 99a74fbe: {(N1, 2017-11-11 11:12:01)}, where N1 is the identifier for node device 104(1) and 2017-11-11 11:12:01 is the TTL indicating the date and time when the value should be purged from the connection database 114 (in other implementations, TTL may be expressed as a single number, such as a number of seconds from an epoch time, or a starting value of a counter or timer). If the node device 104(2) also provided the hash "99a74fbe", the connection manager 112 would update the connection database 114 such that the key-value pair becomes 99a74fbe: {(N1, 2017-11-11 11:12:01), (N2, 2017-11-11 11:12:01)}. The TTL value can be selected by the connection manager 112 according to a policy. For example, the values can be set to expire every hour, day, week, or month. In some implementations, user of a client device 102 may wish to not receive customized content. The user can register with the communication manager 106. When the communication manager 106 detects a user agent, IP address, or hash associated with the user, the communication manager 106 may discard the received information and not make an entry in the connection database 114 for the user.

The method 200 can include generating a connection request (step 213). The client device 102 can generate the connection request and the request can be transmitted to one of the node devices 104. In some implementations, the connection request can be generated at a time after the steps discussed in relation to steps 210-212.

As illustrated in FIG. 2, the connection request can be a request for content that is transmitted to the node device 104(1). The connection request can be the request from a web browser (or another user agent), executed by the client device 102, to request a webpage hosted by the node device 104(1). In some implementations, the request can include data previously stored by the node device 104 on the client device 102. For example, the request can include a first-party cookie that was previously stored on the client device 102 by the node device 104 to which the client device 102 is transmitting the request (e.g., node device 104(1)). In some implementations, the first-party cookie can include a cluster identifier, which can be updated through the method 200. In some implementations, the cluster identifier can be used, by a content provider, to select custom content, determine the distribution of content, or conduct fraudulent detection. For example, the cluster identifier can be embedded within a tag used in making a content request to a content provider. In some implementations, the cluster identifier can be transmitted to the client device 102 in response to receiving the connection request.

The method 200 can include generating a request for a candidate node device (step 214). Responsive to receiving the request for content, the receiving node device 104(1) can generate a request for a candidate node device. In some implementations, the node device 104(1) can transmit the request to the communication manager 106 with an indication of the node device 104(1) as a URL parameter. In other implementations, the indication of the node device may be included in other portions of a packet, such as a header options field. The node device 104(1) can transmit the request for a candidate node to the communication manager 106. The candidate node device (also referred to as a candidate device) can be a node device 104 that may have a first-party cookie stored on the client device 102.

The method 200 can include determining a candidate node device (step 215). In some implementations, the request from the node device 104(1) can include an indication of the user agent and IP address of the client device 102 that generated the request for content at step 213. The connection manager 112 can generate a hash from the indication of the user agent and the IP address. The connection manager 112 can use the hash to determine the candidate node device. The candidate node can be one or more of the node devices 104 saved as values 122 for the key 120 associated with the calculated hash. In some implementations, a plurality of node devices 104 can be associated with a given hash. The connection manager 112 can select one or more of the node devices 104 associated with the hash as the candidate node or node devices.

The method 200 can include determining if the connection with the candidate node has expired (step 216). As described above, each of the values stored in the connection database 114 can be associated with a TTL. The connection manager 112 can determine if the TTL has passed. If the TTL has passed, the connection manager 112 can delete the candidate node from the connection database 114 (step 217). For example, the candidate node can be deleted from the value 122 that is associated with the hash. In some implementations, the connection manager 112 can periodically parse the connection database 114 to determine if any of the values 122 in the connection database 114 should be deleted. The step of determining a candidate node can be repeated until a non-expired candidate node is determined.

An indication of the candidate node can be transmitted to the node device 104 (step 218). The indication of the candidate node can be encrypted during transmission to the node device 104(1). The method 200 can include generating a request response (step 219). The node device 104(1) can generate a response to the request generated at step 213. The response can be, for example, a web page with content that the node device 104(1) selected responsive to the request generated at step 213. The node device 104(1) can incorporate the indication of the candidate node into the response. For example, the node device 104(1) can generate a pixel (e.g., a pixel of an image in the response, or an embedded link to a 1 pixel by 1 pixel image, which may require minimal resources to transfer) that will cause the client device to automatically generate a request to the candidate node when the web page is rendered by the client device 102. For example, the pixel, sometimes referred to as a pixel tag or tracking pixel, may include an HTML image tag linking to a 1 pixel by 1 pixel image at a node device with additional parameters to be included in the URL of a GET request (e.g., as parameter-value pairs). In other implementations, other systems may be used to incorporate the indication of the candidate node device, such as a request for an embedded script, style sheet, media file, or other such request with additional parameters, or an executable command that causes the browser or application to transmit a request (e.g., a POST or GET request with parameter-value data).

Although generally discussed in terms of pixel tags, in many implementations, other such methods may be used. For example, full-page redirects can be used. In this example, the links within a webpage may comprise a full-page redirect. The original links of the webpage can be modified or replaced with links that point to the candidate node device. The location identified by the original link to be included in the modified link as a URL parameter. Once rendered, if the link is selected it can direct the client device's browser to the candidate node device, which can redirect the browser to the location identified by the original link. The web page can include one or more content slots. If an initial cluster identifier was provided to the node device 104(1), the cluster identifier can be embedded in a tag of the content slots. The cluster identifier can be transmitted with a content request for content to fill the content slots. The node device 104(1) can provide the cluster identifier rather than or in addition to a HTTP cookie.

The method 200 can include rendering the response (step 220). For example, the client device's web browser (or user agent) can render the web page (e.g., the response) provided by the node device 104(1). When rendering the web page, the client device 102 can process the pixel that includes instructions to generate a request to the candidate node device. If an initial cluster identifier was embedded in a tag of the content slots, code of the content slot can cause the cluster identifier to be transmitted to a secondary content provider.

The client device can generate a pixel request (step 221). The pixel request can be a request that the client device 102 generates responsive to rendering the pixel that includes the instructions for communicating with the candidate node device. The client device 102 transmits the pixel request to the candidate node device (e.g., node device 104(2) in FIG. 2). The request can include a node identifier for the node device 104(1) that generated the pixel (e.g., node device 104(1)). The node identifier can be included in a URL parameter of the pixel request. In some implementations, the pixel request can cause the user agent to transmit, to the candidate node device, data previously stored on the client device 102 by the candidate node device. For example, the client device 102 may have previously requested a webpage from the candidate node device. In fulfilling the response, the candidate node may have stored a cookie on the client device 102.

The method 200 can include the candidate node generating a notification (step 222). The candidate node can transmit the notification to the communication manager 106. The notification can include the identification of the candidate node and the identification of the node to which the original request in step 213 was transmitted (e.g., node device 104(1)).

The method 200 can include updating a node cluster (step 223). The node cluster that is updated can be identified by a cluster identifier. The communication manager 106 can update the node cluster responsive to receiving the notification from step 222. The cluster manager 116 can parse through the cluster database 118 to identify the cluster associated with the node device 104(1). The cluster manager 116 can append an identification of the candidate node to the list of node devices 104 stored in association with the node device 104(1). The communication manager 106 can transmit the cluster identifier to the node device 104.

The node device 104(1) can receive the cluster identifier (step 224). In some implementations, the node device 104(1) can store the cluster identifier in association with an identification of the client device 102. The node device 104(1) can transmit the cluster identifier to the client device 102 in the form of a HTTP cookie.

In some implementations, responsive to a subsequent request from the client device 102, the node device 104(1) can embed the cluster identifier into a content slot of the request. The content request can be a second, subsequent content request that is transmitted to the node device 104(1) from the client device 102. For example, the second content request can be for a second web page of a domain associated with the node device 104(1). In one example, when the webpage is rendered at step 220, the webpage can include a link to a second webpage. Selecting the link can cause the web browser to generate the content request to which the node device 104(1) can provide the content for the second webpage. The second webpage can include a content slot with the cluster identifier embedded in a tag. In some implementations, the cluster identifier can be transmitted to the client device 102 and stored locally at the client device 102 in a cookie. The client device 102 can provide the cookie (and cluster identifier) to the node device 104(1) when transmitting subsequent requests to the node device 104(1).

The method 200 can include generating, by the client device, a content request that includes the cluster identifier (step 225). In some implementations, the content (e.g., the second web page in the above example) provided to the client device 102 can include one or more content slots that include instructions for requesting or fetching content to fill the one or more content slots. The client device 102 can execute the instructions of the content slots and generate a content request that includes the cluster identifier.

The client device 102 can transmit the content request (with the cluster identifier) to the communication manager 106, which can select a content item (step 226). In some implementations, the content request can be transmitted to a content provider (e.g., the node device 104) other than the communication manager 106. For example, the content provider can be a secondary content server or publisher. The node device 104 can provide primary content in the form of a web page, and the content provider can provide the content for the content slot that included the embedded cluster identifier. The content for the content slot can be selected based on the cluster identifier. For example, the cluster identifier can identify to the communication manager 106 (or other secondary content servers) other websites (or node devices 104) the user agent recently visited, such as a clothing store. In this example, based on the cluster identifier, the content item to fill the content slot may be related to the clothing store.

The communication manager 106 can transmit the content to the client device 102 (step 227). The user agent can render the content into the content slot. In another example, a plurality of websites may be distributed across a plurality of node devices 104. Each of the node devices 104 may host a different domain. The domains may share a common login page. In this example, rather than provide content that is rendered and displayed to a user, the cluster identifier can be used to select a token that is used to authenticate the client device 102 across each of the domains.

Figure 3:
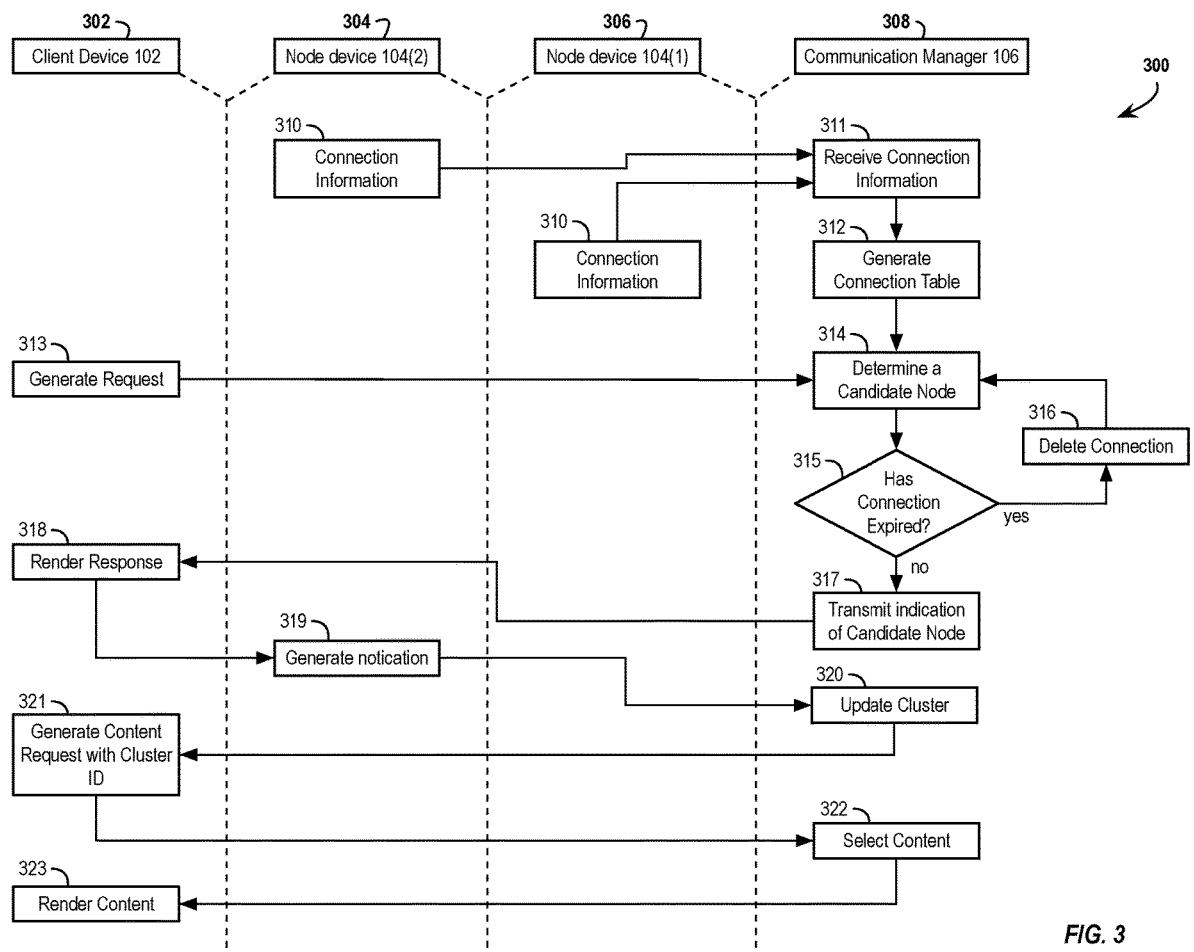
FIG. 3 illustrates a flow diagram of an example method for indirectly communicating data to enable the selection of customized content, according to one implementation.

FIG. 3 illustrates a flow diagram of an example method 300 for indirectly communicating data to enable the selection of customized content. In some implementations, the client 102 can communicate directly with the communication manager 106 to receive a cluster identifier from the communication manager 106. For example, as illustrated in FIG. 3, the client device 102 can initiate communication with communication manager 106 with a request for the cluster identifier (which may include, for example, performing authentication, handshaking, or any other connection establishment and/or authorization procedures). A system where the client device 102 can communicate directly with the communication manager 106 can have easier adoption because the code of the webpage does not need to be updated to instruct the client device 102 to initially establish a connection with the node device 104(1).

In the method 300, as illustrated in FIG. 3, in some implementations, the client device 102 may not directly communicate with the node device 104(1) or some communications may traverse a different path that does not include the node device 104(1). For example, the client device 102 can communicate with the communication manager 106 without using the node device 104(1) as an intermediary. The steps of the method 300 can be performed by one or more of the components of the system 100. For example, as illustrated in FIG. 3, the client device 102 can perform the steps illustrated in column 302, the node device 104(2) can perform the steps illustrated in column 304, the node device 104(1) can perform the steps illustrated in column 306, and the communication manager 106 can perform the steps illustrated in column 308. In other implementations, some or all of these functions or steps may be performed by a single device or group of devices.

In some implementations, prior to the client device 102 generating a connection request, the method 300 can include the node devices 104 transmitting connection information to the communication manager 106 (step 310). While the method 300 is illustrated using two node devices 104, the method 300 can be performed using any number of node devices 104. At regular intervals or when requested by the communication manager 106, the node devices 104 can transmit the connection information to the communication manager 106. The connection information can include user agent information and network location information for the connections established between client devices 102 and the respective node device 104 over a given period of time. The user agent information can be the name and version of the software that the client device 102 uses to establish a connection with the node device 104, or any other such information, which may be in plaintext or encrypted. For example, the user agent can be the web browser that establishes the connection. The network location can be the IP address and/or port associated with the user agent.

In one example, at a predetermined time (e.g., midnight, hourly, every minute, etc.), each of the node devices 104 can transmit an identification of each of the user agents with which the node device 104 established a connection and the respective network location (e.g., IP address) associated with the user agent. In some implementations, the node device 104 can generate a hash by concatenating the user agent and the network address information. The concatenated information can be processed with a hashing function (e.g., MD5, SHA256, etc.) to generate a hash value of a predetermined size. The hash value, rather than the user agent and network location information, can be transmitted to the communication manager 106 such that only the node device 104 with which the client device 102 established a connection is in possession of the connection information. In some implementations, additional data may be added to the concatenated information (e.g., separators, such as commas or semicolons; time stamps; random data, to be used as salt for the hash for extra entropy; etc.).

The method can include the communication manager 106 receiving the connection information from each of the node devices 104 (step 311). In some implementations, the communication manager 106 can poll the node devices 104 to request the connection information from node devices 104. In some implementations, the connection information can expire or the communication manager 106 can delete the connection information (or hashes thereof) at regular intervals. For example, the communication manager 106 can delete the connection information every day, week, or month.

The method 300 can include generating the connection table or database 114 (step 312). The connection manager 112 can generate the connection database 114. A hash of the user agent and network location received from the node devices 104 can be used as the key value 120 in the connection database 114. The node devices 104 can generate the hash prior to transmitting the connection information to the communication manager 106 or the connection manager 112 can generate the hash upon receiving the network connection information. In some implementations in which the node devices generate the hash, the communication manager 106 and/or connection manager 112 may not be able to decrypt the hash or recover the original input (that is, the hashing function may comprise a cryptographically secure hashing function). The connection manager 112 can add each of the hashes to the connection database 114 as keys 120. For each key 120 (e.g., each hash), the connection manager 112 can then append to the value 122 an identification of which node device 104 provided the connection information. The connection manager 112 can also append a TTL element that indicates by which time the associated value should be purged or deleted from the connection database 114. In some implementations, storing an indication of a given node device 104 with a given hash can indicate that the client device 102 for which the hash was generated established a network connection with the given node device 104. The given node device 104 may not have stored a cookie on the client device 102 when the network connection was established.

For example, if the node device 104(1) provided the hash "99a74fbe" to the connection manager 112, at key location 99a74fbe, the node device identifier and a time-to-live (TTL) element can be saved. In this example, the key-value pair can be 99a74fbe: {(N1, 2017-11-11 11:12:01)}, where N1 is the identifier for node device 104(1) and 2017-11-11 11:12:01 is the TTL indicating the date and time when the value should be purged from the connection database 114 (in other implementations, TTL may be expressed as a single number, such as a number of seconds from an epoch time, or a starting value of a counter or timer). If the node device 104(2) also provided the hash "99a74fbe", the connection manager 112 would update the connection database 114 such that the key-value pair becomes 99a74fbe: {(N1, 2017-11-11 11:12:01), (N2, 2017-11-11 11:12:01)}. The TTL value can be selected by the connection manager 112 according to a policy. For example, the values can be set to expire every hour, day, week, or month. In some implementations, user of a client device 102 may wish to not receive customized content. The user can register with the communication manager 106. When the communication manager 106 detects a user agent, IP address, or hash associated with the user, the communication manager 106 may discard the received information and not make an entry in the connection database 114 for the user.

The method 300 can include generating a request (step 313). The client device 102 can generate the request and the client device 102 can transmit the request to the communication manager 106. In some implementations, the request can be generated at a time after the steps discussed in relation to steps 310-312. The request can be a request for a cluster identification or an identification of a plurality of candidate node devices. The candidate node can be a node that previously established a connection with the communication manager 106, such as the node device 104(1). In some implementations, the processor executable instructions that, when executed by the client device 102, cause the client device 102 to generate the request can be in the header of a webpage. The client device 102 can render or otherwise process the instructions prior to rendering the main content of the webpage.

As illustrated in FIG. 3, the request can be a request for a cluster identification. The request can be generated by a web browser (or another user agent), executed by the client device 102. In some implementations, the request can include data previously stored by the node device 104 on the client device 102. For example, the request can include a first-party cookie that was previously stored on the client device 102 by a node device 104. In some implementations, the first-party cookie can include a cluster identifier, which can be updated through the method 300. In some implementations, the cluster identifier can be used, by a content provider, to select custom content, determine the distribution of content, or detect fraudulent detection. The client device 102 can transmit the request to the communication manager 106 as a URL parameter. In other implementations, the indication of the node device may be included in other portions of a packet, such as a header options field.

The method 300 can include determining a candidate node device (step 314). In some implementations, the request from the client device 102 can include an indication of the user agent and IP address of the client device 102 that generated the request at step 313. The connection manager 112 can generate a hash from the indication of the user agent and the IP address. The connection manager 112 can use the hash to determine the candidate node or candidate node devices. For example, the connection manager 112 may compare the generated hash with a hash received from the candidate node or candidate node devices. The candidate node can be one or more of the node devices 104 with hash values saved as values 122 for the key 120 associated with the calculated hash. In some implementations, a plurality of node devices 104 can be associated with a given hash. The connection manager 112 can select one or more of the node devices 104 associated with the hash as the candidate node or node devices.

The method 300 can include determining if the connection with the candidate node has expired (step 315). As described above, each of the values stored in the connection database 114 can be associated with a TTL. The connection manager 112 can determine if the TTL has passed. If the TTL has passed, the connection manager 112 can delete the candidate node from the connection database 114 (step 316). For example, the candidate node can be deleted from the value 122 that is associated with the hash. In some implementations, the connection manager 112 can periodically parse the connection database 114 to determine if any of the values 122 in the connection database 114 should be deleted. The step of determining a candidate node can be repeated until a non-expired candidate node is determined. An indication of the candidate node can be transmitted to the client device 102 (step 317). With the candidate node device, the communication manager 106 can also transmit an indication of the node device 104(2) to the client device 102.

The method 300 can include rendering the response (step 318). For example, the client device's web browser (or user agent) can render the web page (e.g., the response). The web page can include JavaScript or other processor executable code. When rendering the executable code, the client device 102 can process the indication of the node device 104(2) and establish a connection with the node device 104(2). For example, the indication of the node device 104(2) can include a URL corresponding to the node device 104(2) with which the client device 102 can establish a connection with the node device 104(2). After establishing a connection with the node device 104(2) or while establishing a connection with the node device 104(2), the client device 102 can transmit the indication of the candidate node device (e.g., the node's node identifier) to the node device 104(2). For example, the indication of the candidate node can be passed to the node device 104(2) as a URL parameter. In some implementations, the client device 102 can also transmit a cookie to the node device 104(2). The cookie can be a cookie associated with the node device 104(2). For example, the node device 104(2) may have previously provided the cookie to the client device 102 when the client device 102 established communication with the node device 104(2) (e.g., downloaded a webpage provided by the node device 104(2)).

The method 300 can include the node device 104(2) generating a notification (step 319). The node device 104(2) can transmit the notification to the communication manager 106. The notification can be a server side notification. The notification can include the identification of the candidate node device (e.g., node device 104(1)) and an identification of the node device 104(2). In some implementations, the node device 104(2) (and other node devices 104 in the system) can include a sub-domain that is configured to communicate with the communication manager 106. For example, the sub-domain can be managed by the communication manager 106 under the domain of the node devices 104.

The method 300 can include updating a node cluster (step 320). The node cluster that is updated can be identified by a cluster identifier. The communication manager 106 can update the node cluster responsive to receiving the notification from step 319. The cluster manager 116 can parse through the cluster database 118 to identify the cluster associated with the node device 104(2). The cluster manager 116 can append an identification of the candidate node device (e.g., node device 104(1)) to the list of node devices 104 stored in association with the node device 104(2). The communication manager 106 can transmit the cluster identifier to the client device 102. The client device 102 can store the cluster identifier in the form of a HTTP cookie.

In some implementations, responsive to rendering a subsequent web page, the client device 102 can generate a content request (step 321). The client device 102 can embed the cluster identifier into a request for content for a content slot of the web page. For example, the client device 102 can provide the cluster identifier to a content provider. The cluster identifier can be provided in the form of an HTTP cookie or a URL parameter. The content provider can be the communication manager 106 or can be a separate computing device.

The client device 102 can transmit the content request (with the cluster identifier) to the communication manager 106, which can select a content item (step 322). In some implementations, the content request can be transmitted to a content provider (e.g., one of the node devices 104) other than the communication manager 106. For example, the content provider can be a secondary content server or publisher. The node device 104 can provide primary content in the form of a web page, and the content provider can provide the content for the content slot that included the embedded cluster identifier. The content for the content slot can be selected based on the cluster identifier. For example, the cluster identifier can identify to the communication manager 106 (or other secondary content servers) other websites (or node devices 104) the user agent recently visited, such as a website of a retailer. In this example, based on the cluster identifier, the content item to fill the content slot may be related to the retailer.

The communication manager 106 can transmit the content to the client device 102 (step 323). The user agent can render the content into the content slot. In another example, a plurality of websites may be distributed across a plurality of node devices 104. Each of the node devices 104 may host a different domain. The domains may share a common login page. In this example, rather than provide content that is rendered and displayed to a user, the cluster identifier can be used to select a token that is used to authenticate the client device 102 across each of the domains.

Figure 4:
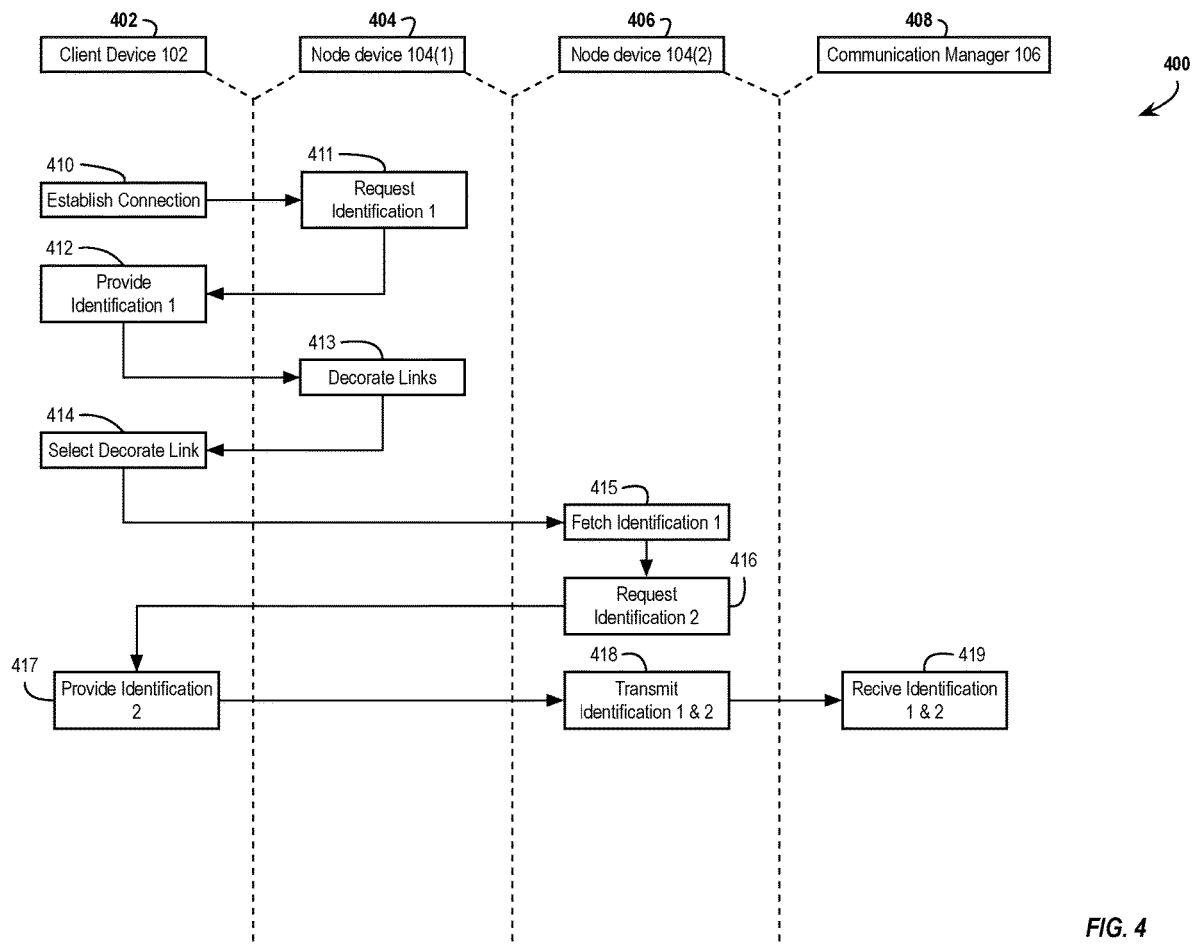
FIG. 4 illustrates a flow diagram of an example method for indirectly communicating data to enable the selection of customized content, according to one implementation.

FIG. 4 illustrates a flow diagram of an example method 400 for indirectly communicating data to enable the selection of customized content. The method 400 can use link decoration and URL parameters to enable indirect data communication. The column 402 indicates actions that can be performed by the client device 102. The column 404 and the column 406 can indicate actions performed by the node device 104(1) and node device 104(2) or by processor executable instructions provided by the node device 104(1) and the node device 104(2), respectively. For example, the columns 404 and 406 can indicate actions performed by the client device 102 on processor executable instructions included in web pages provided by the node device 104(1) and the node device 104(2), respectively. The column 408 can include steps performed by the communication manager 106.

The client device 102 can establish a connection with the node device 104(1) (step 410). For example, a web browser executed by the client device 102 can establish a connection with the node device 104(1) to request a web page hosted by the node device 104(1). The web page can include one or more tags that can include JavaScript or other processor executable instructions.

The method 400 can include the client device 102 rendering (or beginning to render) the web page received from the node device 104(1). When rendering the web page, the client device's web browser can execute the processor executable instructions included in the web page, such as those of one or more tags. Executing the processor executable instructions can cause the web browser to request a first identification from the client device 102 (step 411). The first identification can be an identification that corresponds to the node device 104(1). The first identification can be included in a HTTP cookie that the node device 104(1) stored on or provide to the client device 102. The client device 102 can provide the first identification to the service executing the processor executable instructions of the web page (step 412).

The processor executable instructions of the web page can cause the browser to decorate one or more links of the web page (step 313). Decorating the links can include appending or incorporating the first identification into the links, and may be variously referred to as decorating links, modifying links, aggregating identifications with links, or by other such terms. The first identification can be encrypted before being incorporated into a link. The encrypted first identification can be incorporated into the link as a URL parameter. Once the links are decorated, the web browser executing on the client device 102 can complete the rendering of the web page and display the web page to the user of the client device 102.

In some implementations, decorating the link can include modifying or changing the web location to which the link originally is directed. For example, originally the link can include the web location of a third node device. The decoration of the link can include replacing the web location of the third node device with the web location of the second node device 104(2) such that activation of the decorated link causes the client device 102 to establish a connection (at least originally) with the second node device 104(2) and not the third node device. The web location of the third node can be included in the decorated link as a URL parameter (e.g., a parameter value pair for inclusion after the URL, such as "?v=http://www.example.com"). One the client device 102 establishes a connection with the second node device 104(2), via the decorated link, the second node device 104(2) can use the web location in the URL parameter to automatically redirect the client device 102 to the web location of the third node device. For example, automatic redirection can cause a browser executing on the client device 102 to establish a connection with the third node without further input from a user.

After the web page is rendered, one of the decorated links can be selected (step 414). For example, the user can select or click on the link, which can cause the web browser, executed by the client device 102, to establish a connection with the node identified in the decorated link (e.g., the node device 104(2)). Once the client device 102 establishes a connection with the node device 104(2), the client device 102 can receive, for example, a web page or other processor executable instructions. The client device 102 can process the processor executable instructions to fetch the identification the first identification (step 415). The first identification can be provided in the selected link as a URL parameter. The processor executable instructions from the node device 104(2) can also cause the client device 102 to request a second identification (step 416). The second identification can be an identification that corresponds to the node device 104(2). The second identification can be included in a HTTP cookie that the node device 104(2) can store on or provide to the client device 102. The client device 102 can provide the second identification to the service executing the processor executable instructions of the web page (step 417). The service executing the processor executable instructions provided by the node device 104(2) can link the first and the second identifications and transmit the linked first and second identifications to the communication manager 106 (step 418). The communication manager 106 can receive the first and second identifications (step 419). Once the communication manager 106 receives the first and second identifications, the communication manager 106 can store the identifications in association with one another. For example, the communication manager 106 can store the first and second identifications in association with the same cluster identifier.

Accordingly, disclosed herein are systems and methods for indirectly communicating between networked node devices. According to an aspect of the disclosure, a system for indirect communication between networked node devices can include a data processing system that has at least one processor. The data processing system can be configured to receive an indication of a user agent and a network location of a first client device in communication with the first node device. The data processing system can be configured to determine a candidate node from a plurality of node devices based on a hash of the user agent and the network location of the first client device in communication with the first node device. The data processing system can be configured to transmit to the first node an indication of the candidate node to transmit to the first client device. The data processing system can be configured to receive, from the candidate node device, a notification generated responsive to first client device transmitting a first set of data packets to the candidate device. The data processing system can be configured to add an indication of the candidate node to a node cluster comprising the first node device. The data processing system can be configured to select a content item based on the node cluster. The data processing system can be configured to transmit the content item to the first client device.

In some implementations, the data processing system embeds the indication of the candidate node into a pixel configured to initiate communication with the candidate node device. The first set of data packets can include data previously stored on the first client device by the candidate node device, such as a HTTP cookie, and an identification of the first node device. The notification can include an identification of the candidate node and an identification of the first node device.

In some implementations, the data processing system can be configured to transmit a cluster identifier of the node cluster to a second node device. The data processing system can be configured to receive the cluster identifier from the client device responsive to the client device communicating with the second node device. In some implementations, the data processing system can be configured to determine a second candidate node from the plurality of node devices based on the hash of the user agent and the network location of the first client device in communication with the first node device. The data processing system can transmit, to the first node device, an indication of the second candidate node with the indication of the candidate node device.

In some implementations, the data processing system can be configured to store an indication of each of the plurality of node devices in association with the hash of the user agent and the network location of the first client device. The data processing system can assign a time out period to the indication of each of the plurality of node devices. The data processing system can select the candidate node responsive to the time out period of the candidate node not expiring. In some implementations, the indication of the first node can include a hash of data previously transmitted to the client device and a time stamp.

According to an aspect of the disclosure, a method for indirect communication between networked node devices can include receiving, by a communication manager and from a first node device, an indication of a user agent and a network location of a first client device in communication with the first node device. The method can include determining, by the communication manager, a candidate node from a plurality of node devices based on a hash of the user agent and the network location of the first client device in communication with the first node device. The method can include transmitting, by the communication manager and to the first node device, an indication of the candidate node to transmit to the first client device. The method can include receiving, by the communication manager and from the candidate node device, a notification generated responsive to first client device transmitting a first set of data packets to the candidate device. The method can include adding, by the communication manager, an indication of the candidate node to a node cluster comprising the first node device. The method can include selecting, by the communication manager, a content item based on the node cluster. The method can include transmitting, by the communication manager, the content item to the first client device.

In some implementations, the method can include embedding the indication of the candidate node into a pixel configured to initiate communication with the candidate node device. The first set of data packets can include data previously stored on the first client device by the candidate node and an identification of the first node device. The notification can include an identification of the candidate node and an identification of the first node device. The method can include transmitting, by the communication manager, a cluster identifier of the node cluster to a second node device. The method can include receiving, by the communication manager, the cluster identifier from the client device responsive to the client device communicating with the second node device.

In some implementations, the method can include determining, by the communication manager, a second candidate node from the plurality of node devices based on the hash of the user agent and the network location of the first client device in communication with the first node device. The method can include transmitting, by the communication manager and to the first node device, an indication of the second candidate node with the indication of the candidate node device.

In some implementations, the method can include storing an indication of each of the plurality of node devices in association with the hash of the user agent and the network location of the first client device. The method can include assigning a time out period to the indication of each of the plurality of node devices. In some implementations, the method can include selecting the candidate node responsive to the time out period of the candidate node not expiring. The indication of the first node can include a hash of data previously transmitted to the client device and a time stamp.

According to an aspect of the disclosure, a non-transitory computer readable storage medium can store instructions that when executed by one or more data processors, cause the one or more data processors to receive an indication of a user agent and a network location of a first client device in communication with the first node device. The instructions can also cause the data processing system to determine a candidate node from a plurality of node devices based on a hash of the user agent and the network location of the first client device in communication with the first node device. The instructions can cause the data processing system to transmit, by the communication manager and to the first node device, an indication of the candidate node to transmit to the first client device. The instructions can cause the data processing system to receive, by the communication manager and from the candidate node device, a notification generated responsive to first client device transmitting a first set of data packets to the candidate device. The instructions can cause the data processing system to add, by the communication manager, an indication of the candidate node to a node cluster comprising the first node device. The instructions can cause the data processing system to select, by the communication manager, a content item based on the node cluster. The instructions can cause the data processing system to transmit, by the communication manager, the content item to the first client device.

In some implementations, the instructions can cause the data processing system to transmit, by the communication manager, a cluster identifier of the node cluster to a second node device. The instructions can cause the data processing system to receive, by the communication manager, the cluster identifier from the client device responsive to the client device communicating with the second node device.

According to an aspect of the disclosure, a method can include receiving, by a communication manager and from a client device in communication with a first node device, a request for a connection to a second node device. The request can include a hash of data stored on the client device by the first node device. The method can include selecting, by the communication manager, a candidate node based on the hash of the data stored on the client device by the first node device. The method can include selecting, by the communication manager, a node cluster based on the hash of the data stored on the client device and an indication of the first node device. The node cluster can include a node cluster identification. The method can include transmitting, by the communication manager to the client device, the node cluster identification and a node location to establish a connection between the client device and the candidate node device. The method can include updating, by the communication manager, the node cluster to include the candidate node based on receiving a notification from the candidate node that the client device established a connection with the candidate node device.

In some implementations, the method can include embedding the node location into a pixel configured to initiate communication with the candidate node device. The method can include decorating a link with the node location to redirect a connection to a third node to the candidate node device. The notification can include an identification of the candidate node and an identification of the first node device.

The method can include transmitting, by the communication manager, the updated node cluster identification to the client device. The method can include selecting, by the communication manager, the candidate node from a plurality of node devices based on a hash including a user agent and a network location of the client device.

The method can include storing an indication of the candidate node in association with the hash of the data stored on the client device. The method can include assigning a time out period to the indication of the candidate node device. The method can include selecting the candidate node responsive to a time out period of the candidate node not expiring.

According to an aspect of the disclosure a system indirect communication between node devices can include a communication interface and a processor executing a connection manager. The communication interface can be configured to receive, from a client device in communication with a first node device, a request for a connection to a second node device. The request can include a hash of data stored on the client device by the first node device. The communication manager can be configured to determine a candidate node based on the hash of the data stored on the client device by the first node device. The communication manager can be configured to select a node cluster based on the hash of the data stored on the client device and an indication of the first node device. The node cluster can have a node cluster identification. The interface can be configured to transmit to the client device the node cluster identification and a node location to establish a connection between the client device and the candidate node device. The communication manager can be configured to update the node cluster based on receiving a notification from the candidate node that the client device established a connection with the candidate node device.

In some implementations, the communication manager can be configured to embed the node location into a pixel configured to initiate communication with the candidate node device. The communication manager can be configured to decorate a link with the node location to redirect a connection to a third node to the candidate node device.

The notification can include an identification of the candidate node and an identification of the first node device. The communication manager can be configured to transmit the updated node cluster identification to the client device. The communication manager can be configured to select the candidate node from a plurality of node devices based on a hash including a user agent and a network location of the client device. The communication manager can be configured to store an indication of the candidate node in association with the hash of the data stored on the client device, and assign a time out period to the indication of the candidate node device.

The communication manager can be configured to select the candidate node responsive to a time out period of the candidate node not expiring. The indication of the first node can include a hash of data previously transmitted to the client device and a time stamp.

According to one aspect, a method can include receiving, by a client device from a first node device, a content item that can include a URL to establish a connection with a second node device. The content item can include processor executable instructions provided by a communication manager. The method can include transmitting, by the client device to the communication manager, a request for a candidate node responsive to execution of the processor executable instructions provided by the communication manager. The method can include receiving, by the client device and from the communication manager, an indication of a candidate node device. The method can include modifying, by the client device, the URL to establish a connection with the candidate node device. The method can include transmitting, by the client device and based on a selection of the URL, an indication of the first node device to the candidate node and a web cookie previously transmitted to the client device by the candidate node device. The method can include receiving, from the candidate node by the communication manager, a notification generated responsive to the candidate node receiving the web cookie previously transmitted to the client device by the candidate node device. The notification can include the indication of the first node device. The method can include generating, based on receiving the notification, a node cluster that can include the first node device and the candidate node device.

In some implementations, the method can include receiving, by the communication manager from the client device, a content request. The method can include selecting, by the communication manager, a content item based on the node cluster can include the first node device and the candidate node device. The method can include transmitting, by the communication manager, the content item to the client device responsive to the content request.

The method can include modifying the URL to include the indication of the second node device as a link parameter. The method can include automatically establishing a connection with the second node device responsive to transmitting the indication of the first node device to the candidate node device. The notification can include the indication of the first node device and an indication of the candidate node device as link parameters. The request for the candidate node device can include a hash of a user agent of the client device.

According to one aspect of the disclosure, a system can include a client device and a communication manager. The client device can be configured to receive, from a first node device, a content item that can include a URL to establish a connection with a second node device. The content item can include processor executable instructions provided by a communication manager. The client device can transmit to the communication manager a request for a candidate node device responsive to execution of the processor executable instructions provided by the communication manager. The client device can receive from the communication manager an indication of a candidate node device. The client device can modify the URL to establish a connection with the candidate node device. The client device can transmit, based on a selection of the URL, an indication of the first node device to the candidate node device and a web cookie previously transmitted to the client device by the candidate node device. The communication manager can receive, from the candidate node device, a notification generated responsive to the candidate node device receiving the web cookie previously transmitted to the client device by the candidate node device. The notification can include the indication of the first node device. The communication manager can generate, based on receiving the notification, a node cluster that can include the first node device and the candidate node device.

The communication manager can receive from the client device a content request. The communication manager can select a content item based on the node cluster that can include the first node device and the candidate node device. The communication manager can transmit the content item to the client device responsive to the content request.

In some implementations, the modified URL can include the indication of the second node device as a link parameter. The client device can automatically establish a connection with the second node device responsive to transmitting the indication of the first node device to the candidate node device. The notification can include the indication of the first node device and an indication of the candidate node device as link parameters. The request for the candidate node device can include a hash of a user agent of the client device.

Figure 5:
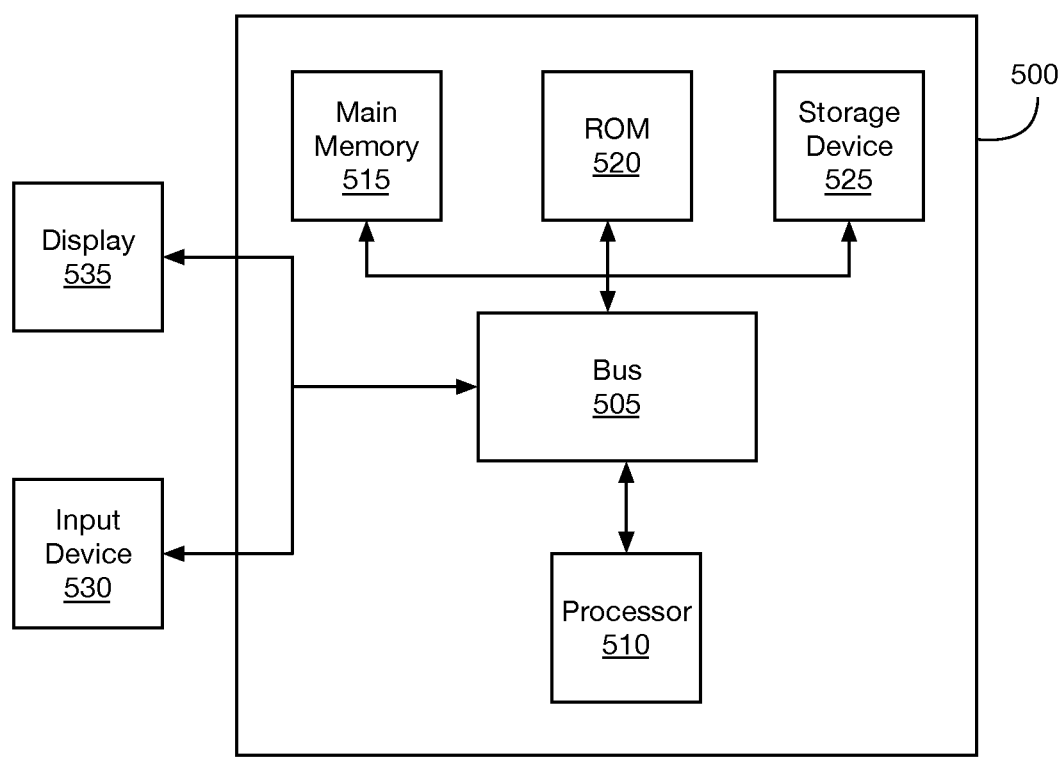
FIG. 5 illustrates a block diagram of an implementation of a computer system for use with the systems and methods discussed herein.

FIG. 5 illustrates a block diagram of an implementation of a computer system 500. The computer system or computing device 500 can include or be used to implement the system 100 or its components such as the communication manager 106. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the connection database 114 and cluster database 118. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk, or optical disk, can be coupled to the bus 505 to persistently store information and instructions. The storage device 525 can include or be part of the connection database 114 and/or the cluster database 118.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of a data processing system (such as the communication manager 106), the client device 102, or other components of FIG. 1.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system", "computing device", "component", or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components described above in relation to FIG. 1 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the communication manager 106) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad-hoc peer-to-peer networks).

The computing system such as system 100 or system 500 can include clients and servers. A client and server are generally remote from each other and typically interact through a communication network (e.g., the network 110). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system from the client device or the content provider computing device or the service provider computing device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including", "comprising", "having", "containing", "involving", "characterized by", "characterized in that", and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation", "some implementations", "one implementation", or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method for indirect communication between networked node devices, comprising:

receiving, by a processor and from a client device in communication with a first node device, a request for a node cluster identification, the request comprising a device identifier of the client device;

determining, by the processor, a candidate node device from a plurality of node devices based on the device identifier of the client device;

transmitting, by the processor, an indication of the candidate node device to the client device, the client device configured to transmit the indication of the candidate node device to the first node device responsive to receiving the indication of the candidate node device from the processor;

receiving, by the processor and from the first node device, a notification comprising an identification of the first node device and an identification of the candidate node device, the notification generated responsive to the first node device receiving the indication of the candidate node device from the client device;
identifying, by the processor, a node cluster based on the identification of the first node device;
updating, by the processor, the identified node cluster to include the identification of the candidate node device;
transmitting, by the processor, a node cluster identification of the identified node cluster to the client device;
receiving, by the processor and from the client device, a content request, the content request comprising the node cluster identification;
selecting, by the processor, a content item based on the node cluster identification; and
transmitting, by the processor, the content item to the client device.

2. The method of claim 1, wherein transmitting the indication of the candidate node device to the client device comprises transmitting, by the processor, an indication of a URL corresponding to the first node device and the indication of the candidate node device to the client device.

3. The method of claim 1, wherein the device identifier of the client device comprises an indication of a user agent and an IP address of the client device.

4. The method of claim 3, wherein determining the candidate node device from the plurality of node devices comprises:
generating, by the processor, a first hash based on the indication of the user agent and the IP address of the client device;
comparing, by the processor, the generated first hash with a second hash that the processor previously received from the candidate node device; and
selecting, by the processor, the candidate device based on the comparison.

5. The method of claim 1, wherein updating the identified node cluster to include the identification of the candidate node device comprises appending, by the processor, the identification of the candidate node device to a list of node devices, wherein each node device of the list of node devices is associated with the node cluster.

6. The method of claim 1, wherein the client device is further configured to transmit an HTTP cookie to the first node device in addition to the indication of the candidate node device.

7. The method of claim 1, further comprising:
storing, by the processor, an indication of each of the plurality of node devices in association with a hash of a user agent and a network location of the first client device; and
assigning, by the processor, a time out period to the indication of each of the plurality of node devices.

8. The method of claim 7, further comprising:
selecting, by the processor, the candidate node device responsive to the time out period of the candidate node device not expiring.

9. The method of claim 1, wherein the indication of the first node device comprises a hash of data previously transmitted to the first node device and a time stamp.

10. A system for indirect communication between networked node devices, the system comprising:
a memory; and
a processor coupled to the memory, the processor configured to:
receive, from a client device in communication with a first node device, a request for a node cluster identification, the request comprising a device identifier of the client device;
determine a candidate node device from a plurality of node devices based on the device identifier of the client device;
transmit an indication of the candidate node device to the client device, the client device configured to transmit the indication of the candidate node device to the first node device responsive to receiving the indication of the candidate node device from the processor;
receive, from the first node device, a notification comprising an identification of the candidate node device and an identification of the first node device, the notification generated responsive to the first node device receiving the indication of the candidate node device from the client device;
identify a node cluster based on the identification of the first node device;
update the identified node cluster to include the identification of the candidate node device;
transmit a node cluster identification of the identified node cluster to the client device;
receive, from the client device, a content request, the content request comprising the node cluster identification;
select a content item based on the node cluster identification; and
transmit the content item to the client device.

11. The system of claim 10, wherein the processor is configured to transmit the indication of the candidate node device to the client device by transmitting an indication of a URL corresponding to the first node device and the indication of the candidate node device to the client device.

12. The system of claim 10, wherein the device identifier of the client device comprises an indication of a user agent and an IP address of the client device.

13. The system of claim 12, the processor is configured to determine the candidate node device from the plurality of node devices by:
generating a first hash based on the indication of the user agent and the IP address of the client device;
comparing the generated first hash with a second hash that the processor previously received from the candidate node device; and
selecting the candidate device based on the comparison.

14. The system of claim 10, wherein the processor is configured to update the identified node cluster to include the identification of the candidate node device by appending the identification of the candidate node device to a list of node devices, wherein each node device of the list of node devices is associated with the node cluster.

15. The system of claim 10, wherein the client device is further configured to transmit an HTTP cookie to the first node device in addition to the indication of the candidate node device.

16. The system of claim 10, wherein the processor is further configured to:
store an indication of each of the plurality of node devices in association with a hash of a user agent and a network location of the first client device; and
assign a time out period to the indication of each of the plurality of node devices.

17. The system of claim 16, wherein the processor is further configured to:
select the candidate node device responsive to the time out period of the candidate node device not expiring.

18. The system of claim 10, wherein the indication of the first node device comprises a hash of data previously transmitted to the first node device and a time stamp.

19. A method for indirect communication between networked node devices, comprising:
   receiving, by a processor and from a client device in communication with a first node device, a request for a node cluster identification, the request comprising a device identifier of the client device;
   determining, by the processor, a candidate node device from a plurality of node devices based on the device identifier of the client device;
   transmitting, by the processor, an indication of the candidate node device and an indication of the first node device to the client device, the client device configured to transmit the indication of the candidate node device to the first node device responsive to receiving the indication of the candidate node device from the processor;
   receiving, by the processor and from the first node device, a notification comprising an identification of the first node device and an identification of the candidate node device, the notification generated responsive to the first node device receiving the indication of the candidate node device from the client device;
   identifying, by the processor, a node cluster based on the indication of the first node device;
   updating, by the processor, the identified node cluster to include an identification of the candidate node device;
   transmitting, by the processor, a node cluster identification of the identified node cluster to the client device;
   receiving, by the processor and from the client device, a content request, the content request comprising the node cluster identification;
   selecting, by the processor, a content item based on the node cluster identification; and
   transmitting, by the processor, the content item to the client device.

20. The method of claim 19, wherein the indication of the first node device comprises a uniform resource locator associated with the first node device.

* * * * *